US012764143B2

(12) United States Patent
Zhao et al.

(10) Patent No.: US 12,764,143 B2
(45) Date of Patent: Oct. 13, 2026

(54) ONE-CLASS THREAT DETECTION USING FEDERATED LEARNING

(71) Applicant: Avast Software s.r.o., Prague (CZ)

(72) Inventors: Yue Zhao, Pittsburgh, PA (US); Acar Tamersoy, Culver City, CA (US); Kevin Roundy, El Segundo, CA (US); Daniel Kats, Torrance, CA (US); Michalis Pachilakis, Dublin (IE)

(73) Assignee: Avast Software s.r.o., Prague (CZ)

( * ) Notice: Subject to any disclaimer, the term of this patent is extended or adjusted under 35 U.S.C. 154(b) by 193 days.

(21) Appl. No.: 18/468,213

(22) Filed: Sep. 15, 2023

(65) Prior Publication Data

US 2025/0097242 A1 Mar. 20, 2025

(51) Int. Cl.
*H04L 9/40* (2022.01)

(52) U.S. Cl.
CPC ........ *H04L 63/1425* (2013.01); *H04L 63/102* (2013.01)

(58) Field of Classification Search
CPC .......................... H04L 63/1425; H04L 63/102
See application file for complete search history.

(56) References Cited

U.S. PATENT DOCUMENTS 10,419,934 B1 * 9/2019 Săpunaru .............. H04L 9/3213
11,210,397 B1 * 12/2021 Sharif ................... G06F 21/566
11,595,437 B1 * 2/2023 Mushtaq ................. H04L 63/20
2018/0367553 A1 * 12/2018 Hayden ............... H04L 63/1425
2022/0294715 A1 * 9/2022 Agrawal ............. H04L 63/1408
2023/0041339 A1 * 2/2023 Ni ........................ G06N 3/0495
2023/0052231 A1 * 2/2023 Marathe .............. G06F 21/6245
2023/0186073 A1 * 6/2023 Paranjape ........... H04L 63/1425 706/15
2023/0188563 A1 * 6/2023 Sircar ................. H04L 63/1483 726/1
2024/0104367 A1 * 3/2024 Lin ........................ G06N 20/00
2024/0259436 A1 * 8/2024 Alexander ............ H04L 63/205
2024/0364723 A1 * 10/2024 Zhang ..................... H04L 51/21

OTHER PUBLICATIONS

Sulayman et al., "Designing Security User Profiles via Anomaly Detection for User Authentication," 2020 International Symposium on Networks, Computers and Communications (ISNCC) Year: 2020 | Conference Paper | Publisher: IEEE.*
Al-Qurishi et al., "Leveraging Analysis of User Behavior to Identify Malicious Activities in Large-Scale Social Networks," IEEE Transactions on Industrial Informatics Year: 2018 | vol. 14, Issue: 2 | Journal Article | Publisher: IEEE.*

* cited by examiner

*Primary Examiner* — Roderick Tolentino
(74) *Attorney, Agent, or Firm* — AVEK IP, LLC; Mark C. Young

(57) ABSTRACT

A machine learning model is trained to classify data as malicious or benign, including receiving the machine learning model in a user device and training the machine learning model on the user device user-generated data that has been classified as known benign. A result of the training is sent to a remote server. Training samples on the user device may be classified automatically, such as classifying sent emails, instant messages, or other content generated by the user as benign.

19 Claims, 4 Drawing Sheets

ONE-CLASS THREAT DETECTION USING FEDERATED LEARNING

FIELD

The field relates generally to user privacy in using computerized devices, and more specifically to user data collection privacy using one-class threat detection using federated learning.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Security of information, including Personally Identifiable Information (PII) and user profile or behavioral information, is also a challenge for both individual users and for companies that collect user information such as this. Personally Identifiable Information includes not only information such as name, birthdate, social security number, and the like, but also includes information such as a user's biometric or behavioral information, the user's text messages and emails, and the user's interactions with others. This information can be used to impersonate a user or steal their identity, to target advertising or other goods and services to a user, or to gather information about a user that they might otherwise wish to remain private.

Rules such as Europe's General Data Protection Regulation (GDPR) have placed limits on what companies can legally do with personal information collected from networked computer users, and what can be done with such information, what types of information can be collected, and similar restrictions. Even when a user consents to their personal information being collected, such as behavioral information collected to help improve development of a product, collected data is typically only allowed to be used for a narrowly defined purpose and for a minimum period of time needed to complete the task. The repository of collected user information is further often a target for malicious activity such as theft of personal information, and presents additional challenges and responsibilities for the data collector.

Many users do not wish to share their personal information with others, desiring instead to maintain their privacy when interacting with various services such as web pages, smart phone apps, and the like. But, computer service providers have a legitimate interest in how users interact with their products, such as how legitimate users of services such as email may differ from illegitimate users of the same services. Service providers use such information not only to block illegitimate users in real-time, but also to train antimalware systems to differentiate between legitimate and malicious users. Such providers often therefore request that users provide them with access to such personal identifiable information, but many users opt out due to concerns over misuse or theft of any collected personal information associated with how they use the product or service.

For reasons such as these, a need exists for a better way of managing user personal identifiable information such as when training antimalware systems.

SUMMARY

One example embodiment comprises a method of training a machine learning model to classify data as malicious or benign, including receiving in a user device a machine learning model configured to classify data as malicious or benign. The machine learning model is trained on the user device user-generated data that has been classified as known benign, and a result of the training is sent to a remote server.

In a further example, one or more training samples on the user device are classified automatically, such as classifying sent emails, instant messages, or other content generated by the user as benign. In some such examples, the user content classified as benign may be screened for known malicious content such as to disqualify the content or the user as a benign training content source.

In some examples, the machine learning model is a neural network such as a graph neural network. In various examples, the machine learning model may be a one-class model, trained to predict one classification or characteristic of data provided as an input to the model. The model in some examples may be trained using stochastic gradient descent on the user device, such that gradients resulting from training on a user device may be sent from the user device to a remote server without directly indicating the content of the user's private data used for training.

The details of one or more examples are set forth in the accompanying drawings and the description below. Other features and advantages will be apparent from the description and drawings, and from the claims.

DETAILED DESCRIPTION

Figure 1:
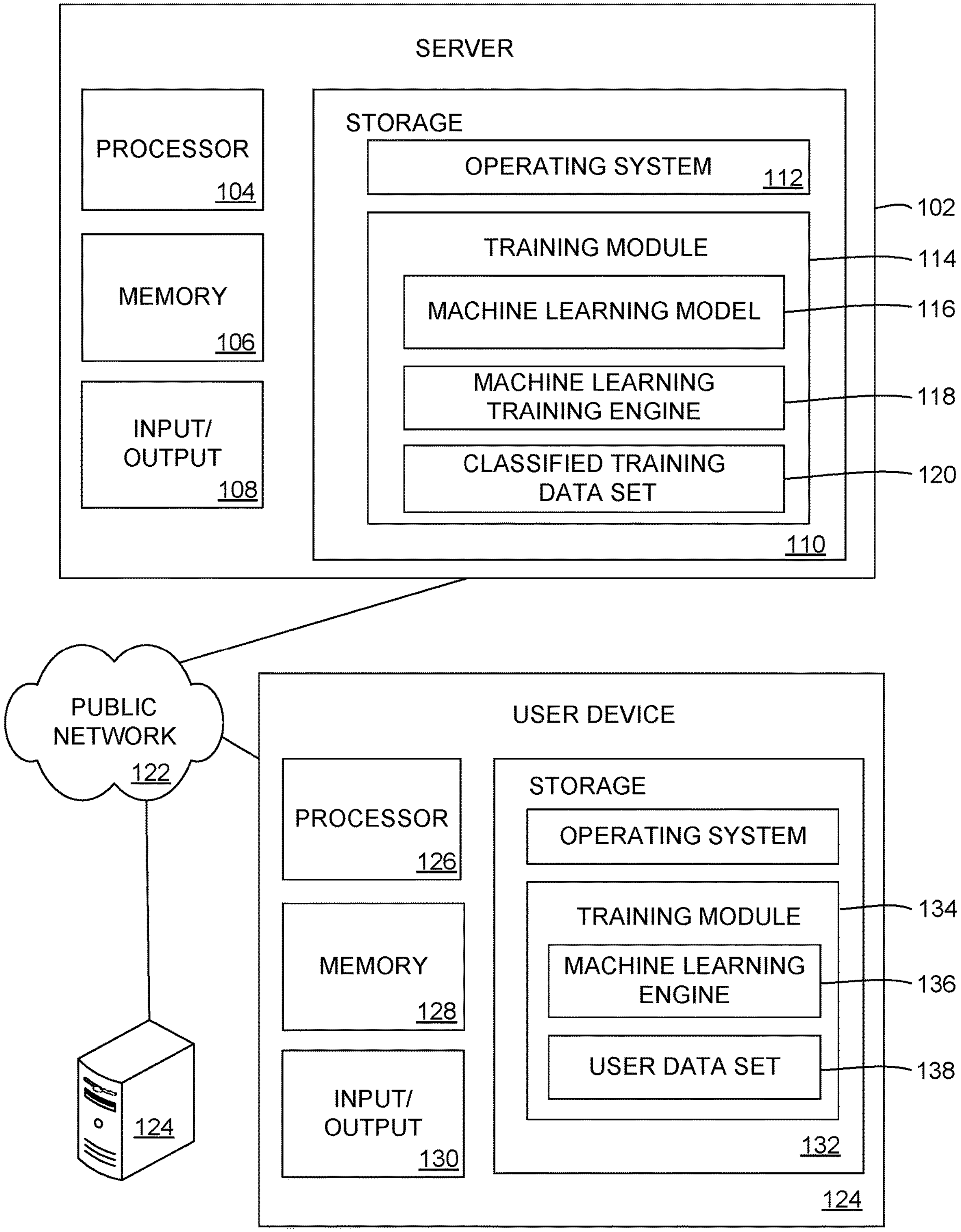
FIG. 1 is a block diagram of a server and user device configured to train a machine learning model using user content, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing passwords and other information from a computer or using the computer for unintended purposes. These safeguards prevent infection from malware such as ransomware, and protect the user's personal information such as identity, credit card numbers, and computer use habits and interests from being captured by others.

Protecting Personally Identifiable Information or PII in particular is legally required to various degrees in some jurisdictions, such as the European Union where the General Data Protection Regulation (GDPR) places limits on collection and use of such information. User data such as name, birthdate, social security number, and the like can be used to impersonate a person or steal their identity, and more private information such as medical history, financial status, or the like may be embarrassing for the user to have made public or have other reasons the user desires information privacy.

Similarly, a user's generated content and communication such as emails, text messages, and photos can reveal a great deal about a person, including personal or private information they don't wish to share with anyone other than the intended recipient. Other information such as biometric or behavioral information such as a user's fingerprint or what activities a user performs when online are also desirably kept secret, as they often relate to security of the user's other accounts or to private activity the user does not wish to share with others. But, protecting personal information is made more complicated because such information is also often used for legitimate purposes, such as where a user's legitimate communications such as emails or text messages can be used to train a machine learning tool to differentiate between malicious and benign content. Romance scams may have some resemblance to legitimate communication between romantic partners, and emails containing legitimate executable code or scripts may resemble malware in which such executable code is hidden or malicious. Although robust databases of known malicious content are readily available, data sets of benign communication are more difficult to acquire, in part due to privacy regulations and concerns.

Some regulations have placed limits on what companies can do with personal information collected from computer users and what can be done with such information, but these regulations vary significantly between jurisdictions and are rapidly changing. Some companies seek a user's consent (such as by disclosure or click-through acceptance) as to what types of information may be collected, how it may be used, and how long it may be retained, and some jurisdictions have their own restrictions stating that collected data is only allowed to be used for a narrowly defined purpose and for a minimum period of time needed to complete the task. Repositories of collected user information are further often a target for malicious activity such as theft of personal information, and present additional challenges and responsibilities for the data collector.

For reasons such as these, some examples presented herein provide systems and methods for training a machine learning model to classify data as malicious or benign by using known benign data on user devices to train the machine learning model while preserving user privacy. In a more detailed example, a server sends a machine learning model configured to classify data as malicious or benign to a user device, and the user device trains the machine learning model using user-generated data classified as known benign on the user device. A result of training the machine learning model is sent to the server, such as to be integrated into the machine learning model.

In a more detailed example, the user-generated data comprises communication such as email, instant messages, or the like that the user has generated and/or sent and that are classified as benign. In other examples, training data includes known benign data created by known reputable senders, data classified as known malicious (such as data identified by a trusted user as malicious or that contains data such as an email address, domain, or phone number known to be associated with malicious content), and/or malicious data from collected data sets of malicious data. The machine learning model in various examples comprises a one-class training model, a graph neural network, and/or training using stochastic gradient descent, and/or training another category of machine learning model using stochastic gradient descent, such as where one or more gradients generated as a result of the training are sent back to the server to be applied to the machine learning model. In some examples, the machine learning model comprises a first model trained to identify malicious data and a second model trained to identify benign data.

FIG. 1 is a block diagram of a server and user device configured to train a machine learning model using user content, consistent with an example embodiment. Here, the server 102 includes a processor 104 operable to execute computer program instructions and a memory 106 operable to store information such as program instructions and other data while computerized device 102 is operating. The server exchanges electronic data, receives input from a user, and performs other such input/output operations with input/output 108. Storage 110 stores program instructions including an operating system 112 that provides an interface between software or programs available for execution and the hardware of the server, and manages other functions such as access to input/output devices. The storage 110 also stores program instructions and other data for a training module 114, including machine learning model 116, a machine learning training engine 118, and a classified training data set 120. In this example, the computerized device is also coupled via a public network 122 to one or more user devices 124, such as remote client computers or other smart phones, or other such computerized user devices.

In operation, the server's training module 114 initiates training of a machine learning model 116, such as by using machine learning training engine 118 to teach the machine learning module to recognize classified training data in the data set 120. In a more detailed example, the machine learning model 116 is a neural network, such as a graph neural network or other neural network, that is trained through a process such as backpropagation of error in the neural network's ability to accurately predict the classification of an input training data element. The training data set in a more detailed example comprises data samples that are known to be benign and/or malicious, such that the trained machine learning module 116 will be able to recognize malicious and/or benign data inputs such as emails, text messages, other communications, and the like.

In the example of FIG. 1, the machine learning module may be trained using malicious classified data from training set 120, which is typically fairly robust due to the high interest in collecting samples of malicious data such as known malicious emails, text messages, documents, executable code, and the like. But, to distinguish malicious data from benign data the machine learning model 116 is also desirably trained on a robust set of known benign data. Known benign training data representing the breadth of benign data likely to be encountered in real-world use is difficult because of the variety in types of benign data likely to be encountered, the variety of different user behaviors likely to be encountered, the sheer number of benign data samples generated every day in the real world, and other such factors. It is therefore desirable to sample real-world benign data from actual users to ensure a robust and representative training set of known benign data for training the machine learning model 116.

Although end users produce a tremendous volume of real-world data that is rich and diverse in content, users generally cannot be expected to accurately characterize or classify content on their devices. In some examples, only certain content on the user's device 124 are presumed to be benign, such as emails, text messages, and other content created by the user, such as in the user's email outbox or sent text message records. In another example, emails and messages from known and trusted senders, such as trusted corporate entities, may also be considered benign and classified as benign in a training data set. In a further example, malicious examples may be classified on the user's device, such as by identifying email addresses, domains, phone numbers, or the like in received emails or text messages that are know to be associated with malicious content, or where a trusted user identifies and classifies a particular data element such as an email or text message as a threat.

Further, asking end users to contribute this data to an antimalware researcher to train a machine learning model 116 may involve significant privacy risks. Few users would want their emails and text messages to become public, or to be read by people other than the intended recipients. Because users will likely wish to maintain privacy and control of their own content such as emails, text messages, and the like, user device 124 in some examples is configured to keep the user data set 138 on the user device and not directly share it with other devices such as server 110. In a more detailed example, user device 124 (such as a smartphone, personal computer, tablet, or the like) includes its own processor 126, memory 128, and input/output 130, much like server 110. The user device 110's storage includes an operating system as well as a machine learning training module 134, which hosts a machine learning model such as 116 from server 110 in machine learning engine 136. The machine learning engine is operable to train the machine learning module using user data set 138 while the user data set remains on the user device, thereby preserving the user's privacy and ownership of their data. Although this method preserves user privacy by keeping the user data set on the user's device 124, it does offload at least a portion of the machine learning model's training to the user's device, in a process sometimes referred to as "federated learning". Such a process enables the machine learning model 116 to be trained on the server 110 using a substantial volume of training data 120 (such as known malicious data), while also training the same machine learning model on known benign and/or malicious data from many different users who may each individually contribute a much more modest data set to the overall data set on which the machine learning model is trained.

In a more detailed example, the machine learning model training process begins with collecting a data set of classified data samples 120, such as known malicious emails, messages, and/or other data of interest. The samples are pre-processed into a vector representation that is suitable for processing in a machine learning model, such as by processing an email EML format file to find headers, body, and/or other fields in the classified data. Obfuscation techniques such as hiding attack scripts in hex format in a JavaScript section of an email body are taken into account, and unusual data formats or data formats known to be of interest may be parsed for analysis. In a further example, content is translated to a common language such as English, while other embodiments will be trained to recognize multilingual threats. The vector representation of an email in a more detailed example comprises a 512-dimension numerical vector representation of the header and a 512-dimension numerical vector representation of the body.

A machine learning model 116 is initiated and trained using these vector representations and known malicious or benign labels, and in a further example comprises a one-class model such as a model configured to recognize only a single class or type of data. In a further example, two one-class models may be trained, including a one-class model trained to recognize benign data and a one-class model trained to recognize malicious data. In such examples, the outputs of both the malicious and benign machine learning models may be used to determine whether a data object is malicious or benign, such as weighing the outputs of the two one-class models depending on the robustness of their training and/or by weighing the degree to which the outputs of the trained benign and malicious one-class models appear consistent with one another for a given input data object.

Once the one-class machine learning model or models are trained in this example using the classified training data set 120 on server 110, they may be further trained to better recognize benign data in particular by sending the partially-trained machine learning models to user device 124. The training module 134 on the user device uses the user's private user data set 138 (such as the user's sent email and/or instant messages) to train the machine learning module, such as by using stochastic gradient descent or another suitable training method, and sends the results of the training (such as the newly-derived gradients) back to the server 102. In an alternate example, the user data set 138 may also include known malicious data, such as data containing email addresses, links or domains, or other information known to be associated with malicious content or bad actors.

In some examples, the server's machine learning model 116 comprises one-class models for both malicious and benign content, such that the one-class model for malicious content may be largely trained on the server due to the relatively rich data set of malicious data that is available to malware researchers. The one-class model for benign data may desirably be trained across a similarly robust and diverse set of training data, such as using user data sets 138 from hundreds or thousands of users, providing additional reliability in determining whether a data sample is likely benign or malicious. In a more detailed example, a one-class model trained to recognize malicious data may be primarily relied upon for malicious content detection before a substantial number of representative end user data sets 138 have been incorporated into training the benign one-class model, with the weight given to the benign one-class model's output being weighted more heavily over time as the number of end user data sets incorporated into its training increases.

Methods and systems such as those described in the example of FIG. 1 show how user data such as sent emails and instant messages may be automatically classified and used for training, such as by assuming sent data such as emails and instant messages are benign and automatically classifying data containing contact information associated with known malicious activity is malicious. The examples further show how using such data to train a machine learning model on a user's device can help protect a user's privacy, and can facilitate training across hundreds or thousands of user data sets to provide a robustly-trained machine learning model. The examples also show how using one-class models, such as one trained to recognize malicious data and one trained to recognize benign data, can be employed to enhance the reliability of classifying a data element as malicious or benign, and how outputs of two such one-class models may be weighted or combined differently depending on factors such as the training state of the one-class models, the degree to which the one-class models agree or disagree, and other such factors.

Figure 2:
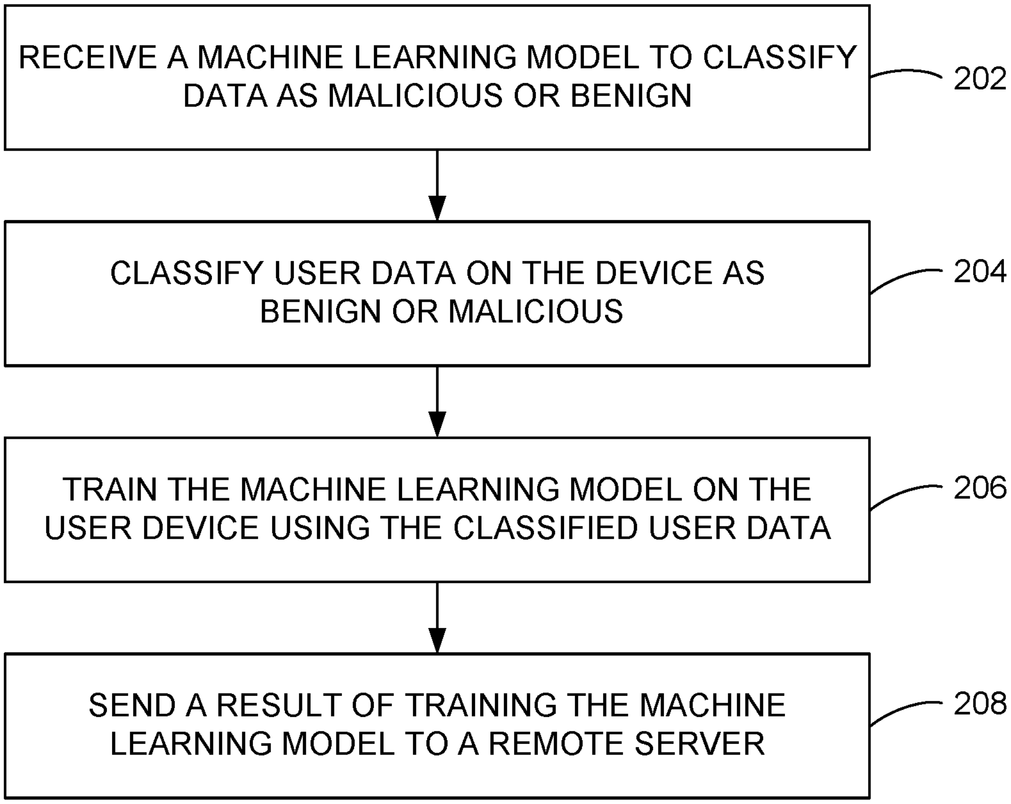
FIG. 2 is a flowchart of a method of training a machine learning model in a user device, consistent with an example embodiment.

FIG. 2 is a flowchart of a method of training a machine learning model in a user device, consistent with an example embodiment. At 202, an end user device receives a machine learning model to classify data as malicious or benign. The machine learning model in some examples may be a neural network, such as a graph neural network or other suitable neural network, and may be configured to receive input tensors representing one or more data types of interest. In a more detailed example, a neural network to receive a email input and classify the email as malicious or benign may be configured to receive a 512 numeric vector representation of the email's header and a 512 numeric vector representation of the email's body, and be configured to provide as an output tensor a numeric value representing whether the email is predicted to be malicious or benign. The machine learning model in some examples is a one-class model, configured to provide a single output representing a single prediction, and in a further example multiple one-class model machine learning models may be used such as one model for determining whether a data input is malicious and one model for determining whether a data input is benign.

In some examples the machine learning model may already have undergone some classification training, while in other examples the machine learning model may be substantially untrained. In a more detailed example, a server may use a robust data set of known malicious data to train at least one machine learning model to recognize malicious data, and may use a representative data set of known benign data to train the model to recognize benign data. The set of known benign data may be data that has been voluntarily provided by users, data that has been pre-screened for content that may violate a user's privacy, or other data that is representative of real-world benign data but that does not violate privacy concerns of end users. In some examples, the benign data set may not be large or robust, but may be sufficient to provide some degree of initial training of the machine learning model to recognize benign data.

Relevant data on the user device that is selected for training may be classified as malicious or benign at 204, such as automatically classifying emails from a trusted user's email sent box as benign. In a further example, the user's sent box may be evaluated to ensure the user is not malicious, emails received in the user's inbox from trusted users such as large corporations may be classified as benign, and emails in the user's inbox, spam box, trash, or the like that contain contact info such as email addresses or web domains associated with known malicious content may be classified as malicious. In some examples, automated classification of user data as malicious or benign may help reduce the burden end users who may lack the expertise or interest in properly classifying potential training data found on the end user's device, and may preserve the privacy of the user's data by not exposing it to malware researchers or others for manual classification.

The classified user data in some examples may be preprocessed, such as to separate data such as emails into different parts such as headers and email body, or to perform other such processing. In a further example, feature or threat extraction may be performed, such as searching the body portion and/or attachments of an email for JavaScript or other potentially malicious content. In another example, content may be translated to a common language, such as English, to accelerate convergence in training the machine learning model. In still other examples, known benign elements are removed during preprocessing, such as punctuation and stop words that do not contribute information to text in a email or instant message. In some examples, preprocessing steps such as these and/or other preprocessing steps may be taken at least in part to remove irrelevant data, categorize data elements, and/or normalize data used as input to the machine learning model such as vector inputs to a neural network.

At 206, the machine learning model received in the user device is trained using the classified user data. This is performed in this example without the user data leaving the user's device, preserving the user's privacy. The training in a more detailed example comprises using stochastic gradient descent to determine gradients or changes in the received model's neural network node weights as a result of the training, such that the gradients may be sent back to a server at 208 and applied to the sent machine learning model to update the model without directly revealing any user content to the server. In other examples, the updated machine learning model may be sent back to the server rather than the gradients or changes, or the results of the training may be otherwise communicated to the server without directly revealing private user data.

Figure 3:
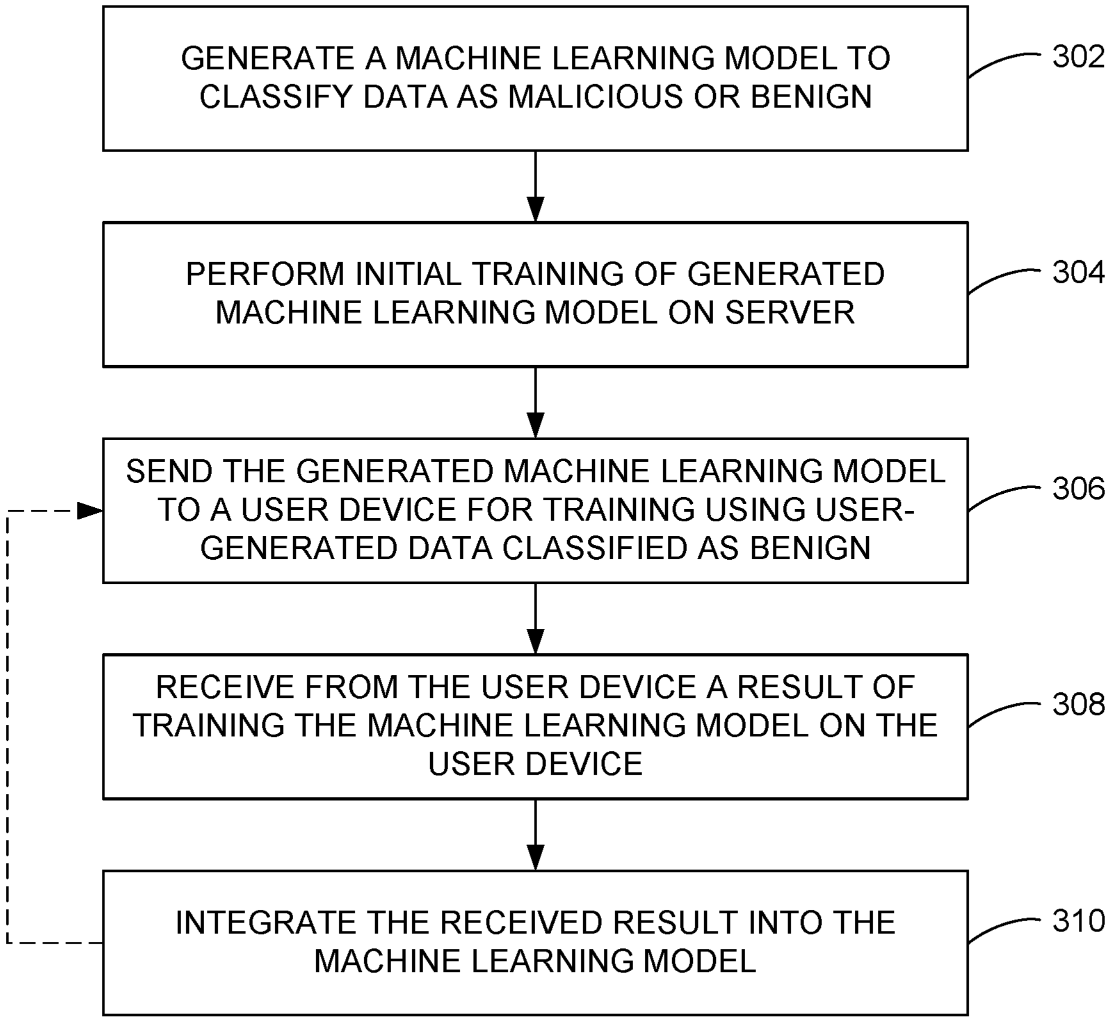
FIG. 3 is a flowchart of a method of training a machine learning model in a server, consistent with an example embodiment.

FIG. 3 is a flowchart of a method of training a machine learning model in a server, consistent with an example embodiment. Some embodiments of the method shown in FIG. 3 are similar to various embodiments of FIG. 2, but from the perspective of one or more servers (e.g., server 102) rather than a user device (e.g. user device 124).

At 302, a machine learning model training module such as is shown in FIG. 1 generates a machine learning model to classify data as malicious or benign. The machine learning model in various embodiments may comprise a neural network such as a graph neural network, and in some further examples comprises a one-class model operable to classify data inputs or input tensors as being a member of a single class, such as malicious or benign. In some examples, separate one-class models are trained to recognize both malicious content and benign content independently, and when trained may be used together to determine whether an input is malicious or benign.

At 304, the generated machine learning model may undergo initial training, such as using a training data set of collected malicious and/or benign input samples available to the server. In some examples, a one-class model trained to recognize malicious data may be primarily trained on the server, while a one-class model trained to recognize benign data may be initially trained with a small set of known benign data relative to the overall amount of training data that will eventually be used to train the model. Because diverse and up-to-date benign user data is difficult to accumulate without violating user privacy, and for other such reasons, the generated machine learning model with initial training complete may be sent to a user device at 306 for additional training using user-generated benign data. The user-generated benign data in various examples may comprise emails, instant messages, and the like that the user has generated and that are found in the user's sent box or that are otherwise identifiable.

In a further example, the user-generated data is screened to ensure it is not malicious before being classified as benign, such as by looking for contact information, executable code, or other content that is associated with known malicious content. In some examples, user data that the user has received from other users is also classified for training, such as by classifying data received from known benign users such as large corporations as benign and classifying data containing contact information, executable code, or other content that is associated with known malicious content as malicious.

At 308, the server receives the result of the training from the user device, and integrates the result into the machine learning model at 310. In a more detailed example, the training is performed using stochastic gradient descent, and gradients resulting from the training are received at 308 and integrated into the machine learning model at 310 to apply the training to the machine learning model stored on the server. Although the gradients or other training results may indicate results of the training performed on the user's device, they may not directly indicate or contain the user's private training data, such that the privacy of the user's data is preserved.

In a further example, the process of sending the generated machine learning model to a user device, receiving updates to the model as a result of the training on the user device, and integrating the results into the machine learning model managed on the server as reflected in steps 306-310 is repeated for many users, such as hundreds or thousands or more of users, to ensure a diverse and robust training data set of benign data is used in training the machine learning model.

These examples show how training machine learning models to recognize benign and/or malicious data using automated classification of data on user devices can preserve privacy of user data while allowing the machine learning models to benefit from a robust and diverse training set of user data. Although the server, user device, and other computerized systems are shown here as single devices having certain characteristics, in other examples other devices may be employed, such as user devices taking other forms or servers distributed across multiple physical machines.

Figure 4:
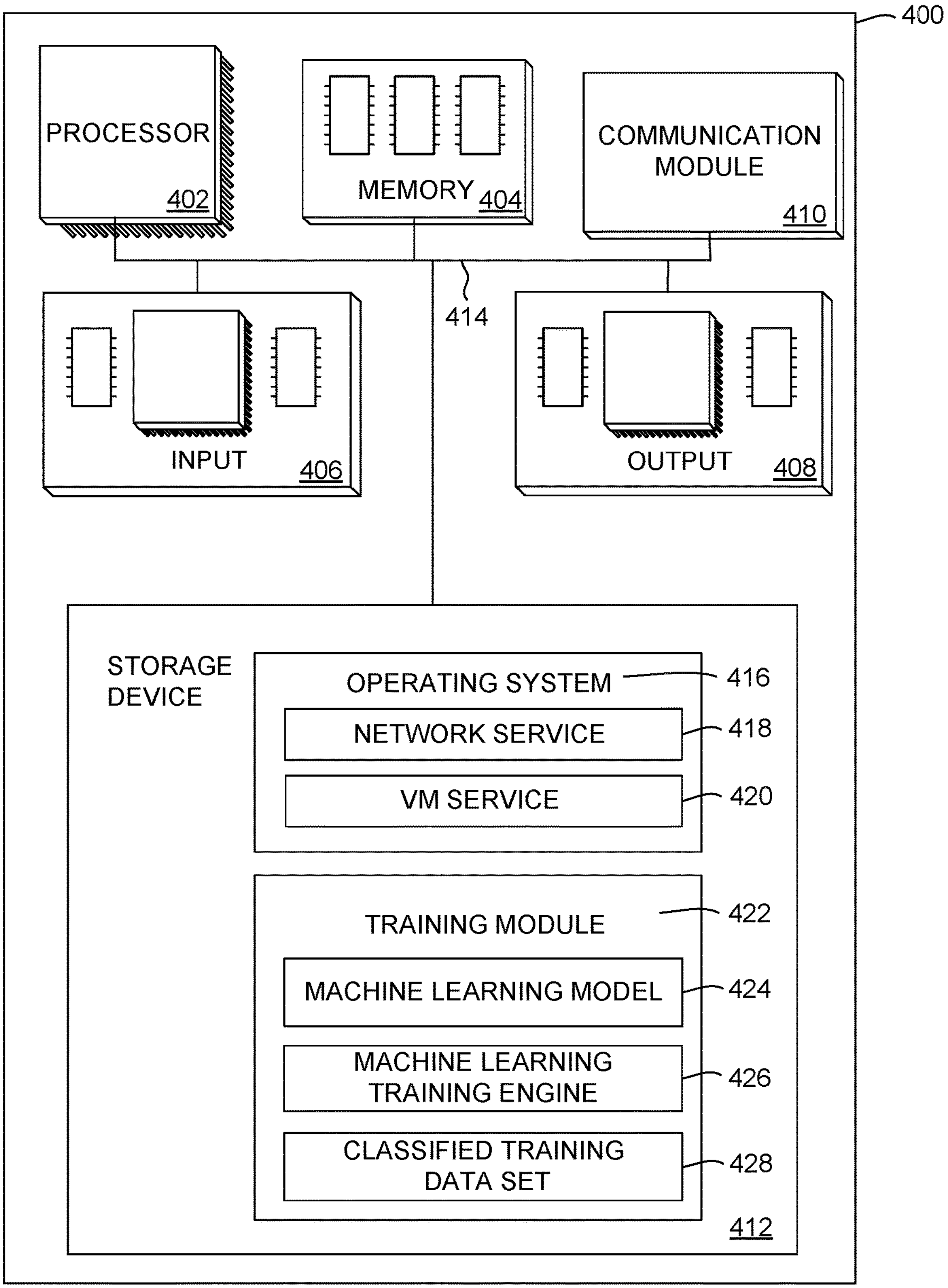
FIG. 4 is a computerized system employing a machine learning model training module, consistent with an example embodiment.

FIG. 4 is a computerized system employing a machine learning model training module, consistent with an example embodiment. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such as training module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as training module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such training module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as training module 422 to components of computing device 400. For example, operating system 416, in one example, facilitates the communication of various applications such as training module 422 with processors 402, communication unit 410, storage device 412, input device 406, and output device 408. Applications such as training module 422 may include program instructions and/or data that are executable by computing device 400. As one example, training module 422 uses machine learning training engine 424 and classified training data set 428 to train a machine learning model 424, and to coordinate further training of at least one machine learning model 424 on at least one user device using user data in a manner that preserves user data privacy. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of training a machine learning model to classify data as malicious or benign, comprising:

receiving in a user device a machine learning model configured to classify data as malicious or benign;

training the machine learning model locally on the user device using user-generated data on the user device, the user-generated data classified as known benign, wherein training the machine learning model comprises training a user-specific one-class training model exclusively on the known benign user-generated data to establish a baseline behavioral profile for a user, wherein the user-generated data comprises only at least one of a user's sent email and/or sent messages, and wherein training the machine learning model comprises iteratively updating model parameters on the user device using stochastic gradient descent;

determining, by the user device, whether a subsequently received or generated communication deviates from the baseline behavioral profile beyond a deviation threshold to identify anomalous behavior indicative of malicious activity; and sending a result of training the machine learning model to a remote server, wherein the result of training comprises one or more gradients generated by the local training on the user device, wherein the user generated data is not sent to the remote server, and wherein the one or more gradients generated as a result of the training are sent to the remote server to be applied to the machine learning model.

2. The method of training a machine learning model to classify data as malicious or benign of claim 1, wherein the user-generated data comprises user communication.

3. The method of training a machine learning model to classify data as malicious or benign of claim 2, wherein the user communication comprises at least one of email and/or instant messages.

4. The method of training a machine learning model to classify data as malicious or benign of claim 1, wherein the user-generated data comprises at least one of a user's sent email and/or sent messages.

5. The method of training a machine learning model to classify data as malicious or benign of claim 1, wherein the user-generated data comprises user-generated data generated by a user classified as a reputable sender.

6. The method of training a machine learning model to classify data as malicious or benign of claim 1, further comprising training the machine learning model on the user device using data classified as known malicious.

7. The method of training a machine learning model to classify data as malicious or benign of claim 6, wherein the data classified as known malicious comprises at least one of data from known malicious sources or data identified by a trusted user as malicious.

8. The method of training a machine learning model to classify data as malicious or benign of claim 7, wherein data from known malicious sources comprises data associated with at least one of an email, domain, phone number, or contact information associated with previously known malicious data.

9. The method of training a machine learning model to classify data as malicious or benign of claim 1, wherein training the machine learning model comprises training a graph neural network.

10. The method of training a machine learning model to classify data as malicious or benign of claim 1, wherein training the machine learning model comprises training using stochastic gradient descent, and wherein one or more gradients generated as a result of the training are sent back to the server to be applied to the machine learning model.

11. The method of training a machine learning model to classify data as malicious or benign of claim 1, wherein training the machine learning model comprises training a first model to identify malicious data and a second model to identify benign data.

12. A method of training a machine learning model to classify data as malicious or benign, comprising:

sending a machine learning model configured to classify data as malicious or benign from a server to a user device; and receiving from the user device a result of training the machine learning model locally on the user device using user-generated data on the user device, the user-generated data classified as known benign, wherein training comprises training a user-specific one-class anomaly detection model exclusively on the known benign user-generated data to learn a baseline behavioral representation of the user, wherein the user-generated data comprises only at least one of user-sent email, user-sent instant messages, and/or user-sent communication, and wherein training the machine learning model comprises local iterative training using stochastic gradient descent, and wherein receiving from the user device the result of training comprises receiving only one or more gradients generated as a result of the training without receiving the user-generated data, aggregating the received gradients to update a server version of the machine learning model, and sending an updated version of the machine learning model to one or more user devices.

13. The method of training a machine learning model to classify data as malicious or benign of claim 12, wherein the user-generated data comprises at least one of user-sent email, user-sent instant messages, and/or user-sent communication.

14. The method of training a machine learning model to classify data as malicious or benign of claim 12, wherein the result of training the machine learning model further comprises a result of training the machine learning model on the user device using data classified as known malicious.

15. The method of training a machine learning model to classify data as malicious or benign of claim 14, wherein the data classified as known malicious comprises at least one of data from known malicious sources or data identified by a trusted user as malicious.

16. The method of training a machine learning model to classify data as malicious or benign of claim 12, wherein training the machine learning model comprises training at least one of a one-class training model and/or a graph neural network.

17. The method of training a machine learning model to classify data as malicious or benign of claim 12, wherein training the machine learning model comprises training using stochastic gradient descent, and wherein receiving from the user device a result of training the machine learning model comprises receiving one or more gradients generated as a result of the training and applying the one or more received gradients to the machine learning model.

18. The method of training a machine learning model to classify data as malicious or benign of claim 1, wherein training the machine learning model comprises training a first model to identify malicious data and a second model to identify benign data.

19. A computerized system, comprising:

a user device comprising a processor and a nonvolatile storage, the nonvolatile storage comprising coded instructions that when executed on the user device cause the user device to:

receive a machine learning model configured to classify data as malicious or benign;

train the machine learning model locally on the user device using user-generated data on the user device, the user-generated data classified as known benign, wherein training the machine learning model comprises training a user specific one-class training model exclusively on the known benign user-generated data to establish a baseline behavioral profile for a user, wherein the user-generated data comprises only at least one of a user's sent email and/or sent messages, and wherein training the machine learning model comprises locally updating model parameters using stochastic gradient descent;

determine whether a subsequently received or generated communication deviates from the baseline behavioral profile beyond a deviation threshold to identify anomalous behavior; and send a result of training the machine learning model to a remote server, wherein the result of training comprises only one or more gradients generated as a result of the training that are sent to the remote server without transmitting the user-generated data, and wherein the remote server aggregates gradients received from a plurality of user devices to update a shared machine learning model and transmits an updated machine learning model to the user device.

* * * * *